United States Patent [19]

Marler

[11] Patent Number: 5,456,067
[45] Date of Patent: Oct. 10, 1995

[54] OIL RESISTANT PICK-UP BELT AND SWATHER CANVAS

[75] Inventor: Ronald L. Marler, Wichita, Kans.

[73] Assignee: Legg Company, Inc., Halstead, Kans.

[21] Appl. No.: 222,689

[22] Filed: Apr. 4, 1994

[51] Int. Cl.$^6$ ........................................................ F16G 1/00
[52] U.S. Cl. .............................. 56/49; 474/264; 525/173
[58] Field of Search ...................... 56/49, DIG. 4; 474/205, 251, 263, 206, 264–268; 525/54.5, 88, 165, 169, 171, 173, 177, 271; 524/59, 68, 71, 100; 428/17, 85, 87, 90, 378, 380, 390; 198/846–847

[56] References Cited

U.S. PATENT DOCUMENTS

| | | |
|---|---|---|
| 2,286,055 | 6/1942 | Brittell . |
| 2,305,044 | 12/1942 | Toews . |
| 2,400,667 | 5/1946 | Toews . |
| 4,290,927 | 9/1981 | Tanaka et al. ............... 525/165 X |
| 4,316,536 | 2/1982 | Verbeek . |
| 4,367,316 | 1/1983 | Tanaka et al. ................... 525/173 |
| 4,956,405 | 9/1990 | Wheeler et al. ................. 524/100 |
| 5,115,035 | 5/1992 | Shiraki et al. .............. 525/271 X |
| 5,141,101 | 8/1992 | Vance et al. . |
| 5,219,902 | 6/1993 | Mishima et al. ............. 428/380 X |

OTHER PUBLICATIONS

Sparks brochure entitled "Cleated Belting".

Primary Examiner—Michael Powell Buiz
Attorney, Agent, or Firm—Hill, Steadman & Simpson

[57] ABSTRACT

An improved crop harvesting belt for swather belt and pick-up belt applications, which is both oil resistant and cold weather reliable, the belt made of a compound of styrene butadiene rubber and nitrile rubber, the nitrile rubber preferably at approximately 6% of the compound and having an acrylonitrile level of approximately 33% by weight.

14 Claims, 1 Drawing Sheet

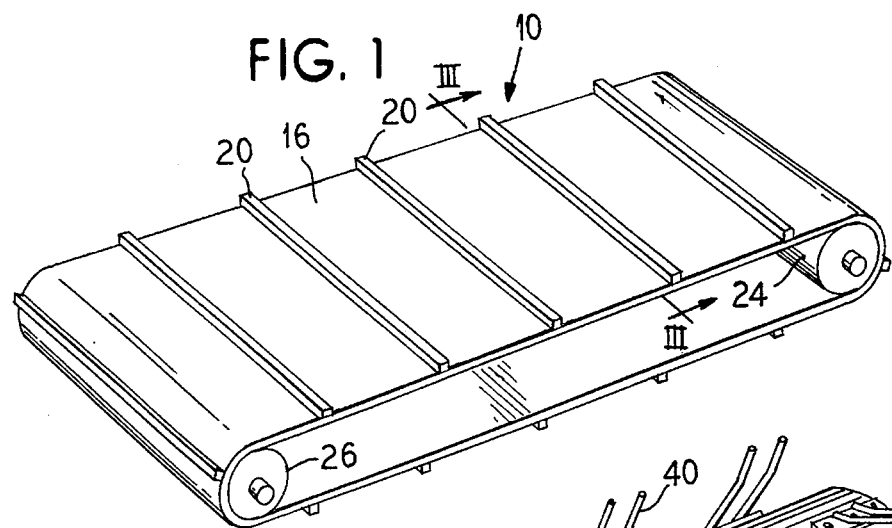
FIG. 1
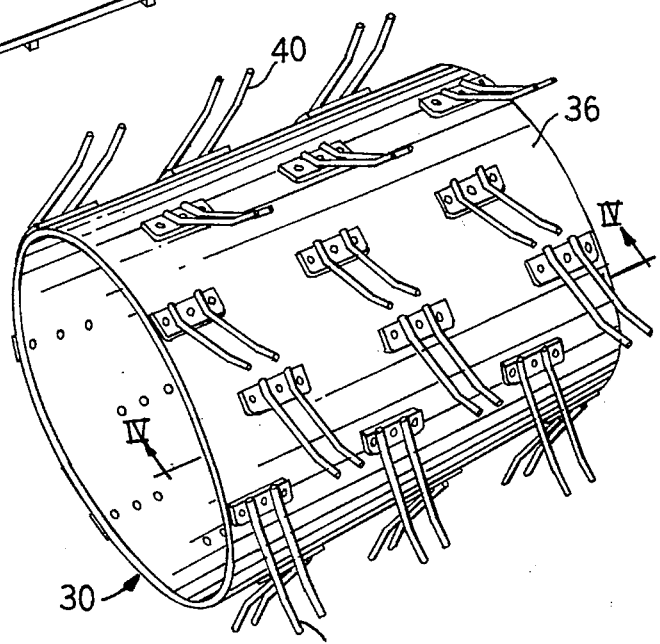
FIG. 2
FIG. 3
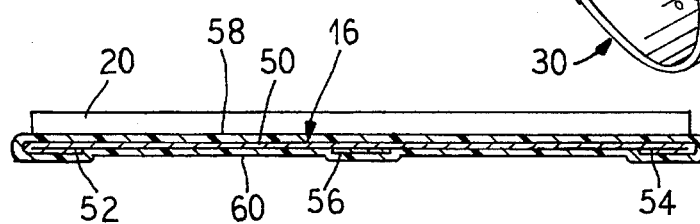
FIG. 4
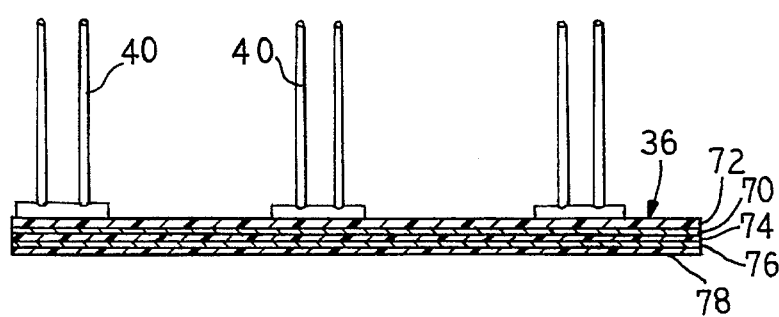

OIL RESISTANT PICK-UP BELT AND SWATHER CANVAS

BACKGROUND OF THE INVENTION

The present invention relates to agricultural belts used in the harvesting of crops. In particular, the present invention relates to an improved material of construction for combine pick-up belts and swather belts or "canvas".

If the growing season is too short or the crops need to ripen all at the same time, the crops must be cut and windrowed by a swather "belt" or "canvas". A swather belt has regularly spaced cleats or slats for conveying the crops into windrows. A swather belt is described in U.S. Pat. No. 4,316,536. After a windrowed crop has ripened, then a combine is brought in with a pick-up attachment that utilizes a combine pick-up belt. The pick-up belt has tines attached to the belt that act like fingers which scoop up the windrow and harvest the crop through the combine.

Rubber coated swather and pick-up belts have been made for years using a composition of styrene butadiene rubber (SBR) which includes ozone and sunlight resistance, but which lacks oil resistance when harvesting crops such as canola and soybeans. Oil levels are particularly high at the point of harvest. The oiliness of the crops in these applications can break down the chemical composition of the SBR compound which in turn shortens the life of the belt.

There currently are oil resistant swather and pick-up belts available made of polyvinyl chloride (PVC) coated fabric instead of rubber coated fabric. PVC may be oil resistant, but it does not perform well in cold weather. PVC swather and pick-up belts have had problems due to cracking and cleat separation from the belt. On the other hand, vulcanized rubber has performed well for years in all types of weather conditions. Therefore, by adding oil resistance, a rubber coated swather belt and pick-up belts would be considered a superior product for use in any type of crop application.

SUMMARY OF THE INVENTION

It is an object of the present invention to provide both a pick-up belt and a swather belt made of oil resistant, yet flexible material even in cold weather. It is an object of the invention to provide a belt which resists cracking and separation of cleats or slats during cold weather by retaining its flexibility and which prevents deterioration due to harvesting oily crops such as canola or soybeans.

The objects are inventively achieved by producing a belt which has fabric coated with a composition of styrene butadiene rubber (SBR) plus nitrile rubber or polymer. The addition of nitrile rubber promotes oil resistance by reducing oil swell.

Oil swell indicates the amount of oil resistance. The oil resistance of the present inventive composition for coating a belt should have an oil swell within the range of 100% by volume to 40% by volume when tested per ASTM 471 in ASTM No. 3 oil for 70 hours at 100° C. According to the invention, the preferred composition is approximately 5.6% nitrile rubber or polymer by weight of the total composition including nitrile polymer, SBR, carbon black and fillers. This 5.6% nitrile rubber contains an acrylonitrile content of 33% by weight which makes the acrylonitrile content 1.8% of the total composition. This preferred composition with these percentages results in a 71% oil swell. The same or similar level of oil resistance can be achieved using a lower acrylonitrile content in the nitrile polymer with a higher percentage of the nitrile polymer in the total composition, thus yielding the same or similar total acrylonitrile level as the preferred composition.

BRIEF DESCRIPTION OF THE DRAWINGS

FIG. 1 is a perspective view of a swather canvas as used in the present invention;

FIG. 2 is a perspective view of a pick-up run belt of the present invention;

FIG. 3 is a cross sectional view taken generally along line III—III of FIG. 1; and FIG. 4 is a cross sectional view taken generally along line IV—IV of FIG. 2.

DETAILED DESCRIPTION OF THE PREFERRED EMBODIMENTS

FIG. 1 shows a conveyor 10 of a swather or a windrower-type agricultural apparatus. Attached to a coated "belt" or "canvas" 16 are cleats or slats 20 at regular intervals. The cleats can be metal, plastic, rubber, or wood and are attached by a variety of methods including riveting, vulcanizing, etc. According to the invention, the belt 16 is coated with a composition of SBR plus nitrile rubber which produce cold weather resistance to cracking and inflexibility as well as oil resistance which prolongs the life of the belt. The swather belt is effective and long lasting in both cold weather and oily crop applications, resisting cracking and belt failure due to oil impregnation. This oil resistance is useful when harvesting oily products such as canola and soybeans.

FIG. 2 illustrates a pick-up belt 30 of an agricultural combine pick-up attachment. A coated belt fabric 36 has spaced pick-up tines 40 extending therefrom. Tines can be metal or plastic and are attached typically by riveting or bolting. The belt fabric also uses a SBR and nitrile rubber coating composition of the present invention. Like the swather belt, the pick-up belt of the present invention is effective and long lasting in both cold weather and oily crop applications, resisting cracking and belt failure due to oil impregnation.

Advantageously, when tested per ASTM 471 in ASTM No. 3 oil for 70 hours at 100° C. the coating composition of the present invention would have as a minimum acrylonitrile levels that would produce an oil swell of 100% by volume and maximum acrylonitrile levels that would produce an oil swell of 40% by volume. An exemplary composition for the coating of the fabrics 16, 36 that is used to achieve an oil resistance within this range has 5.6% by weight nitrile polymer or rubber, the nitrile polymer having an acrylonitrile content of 33%. The acrylonitrile content of the composition is then approximately 1.8% by weight. Other constituents of the composition are SBR (31%), carbon black (26%), aromatic oil (19.7%), mineral fillers (9.3%), antidegradants (1.0%), plasticizers (3.7%) and curatives (3.7%). Other nitrile polymers can achieve this level of oil resistance with a lower acrylonitrile content but would require a higher percentage of the nitrile polymer in the make up of the total composition.

The coating composition of the present invention has heretofore been known and used to coat industrial or factory conveyor belts. Applicant has discovered the present inventive application of such coatings to crop harvesting belts to overcome the problems of oily crop and cold weather induced belt failure.

Advantageously, swather belt 16 is formed of a spun or filament polyester fabric and the coating of the present invention is applied to both sides with a calendered friction coat or a skim coat. The pick-up belt 30 can be a two-ply belt using polyester filament and spun layers and using calendered friction coats and skim coats of the composition of the present invention on the layers, as applicable. The fabric layers and coating compositions are vulcanized under heat and pressure to unitize the structure. The actual method of application of the oil resistant coating of the present invention and the layer structure of the belts 16, 30 can be the same as the structure and method of manufacture of non-oil resistant rubber composition fabric belts.

Preferably, as shown in FIG. 3, the swather belt comprises a spun polyester fabric 50 folded over at edge regions 52, 54 and provided with a center strip 56 to provide reinforced areas to prolong the life of the belt and to provide strength. The fabric 50 has calendered friction coats 58, 60 of the SBR and nitrile rubber composition of the present invention. The inventive composition is preferably applied to both surfaces and edges of the belt, although a one-sided application of the inventive composition is encompassed by the invention.

The pick-up belt preferably comprises a spun polyester fabric 70 covered on one side by a calendered friction coat 72. On an opposite side, the fabric 70 is covered by a 0.035" skim coat 74 which covers a filament polyester fabric 76. An opposite side of the filament polyester fabric 76 is covered by a 0.030" skim coat 78. Preferably, the coatings 72, 74 and 78 are all composed of the SBR and nitrile rubber composition of the present invention. However, advantageous performance may be expected if less than all of the coatings are composed of the oil resistant coating of the present invention, and any such application is nevertheless encompassed by the present invention. As stated above, both the swather and pick-up belts shown in FIGS. 3 and 4 are vulcanized under heat and pressure to unitize the structures.

Although the present invention has been described with reference to a specific embodiment, those of skill in the art will recognize that changes may be made thereto without departing from the scope and spirit of the invention as set forth in the appended claims.

I claim as my invention:

1. An oil resistant belt mounted on a mobile harvesting machine for field harvesting crops, the belt in contact with the crops, having a coating material composition comprising:

styrene butadiene rubber and nitrile rubber.

2. The belt according to claim 1, wherein the nitrile rubber level is selected to achieve an oil resistance as measured under ASTM 471 in ASTM No. 3 oil for 70 hours at 100° C. of between 100% oil swell by volume and 40% oil swell by volume.

3. The belt according to claim 1, wherein an acrylonitrile level in the nitrile rubber is approximately ⅓ by weight.

4. The belt according to claim 1, wherein the level of nitrile rubber in the material composition is approximately 6% by weight.

5. The belt according to claim 1, wherein an acrylonitrile level in the nitrile rubber is approximately 2% by weight of the composition.

6. The belt according to claim 1, wherein said belt is a pick-up belt.

7. The belt according to claim 1, wherein said belt is a swather belt.

8. The belt according to claim 1, wherein the nitrile rubber level is selected to achieve an oil resistance as measured under ASTM 471 in ASTM No. 3 oil for 70 hours at 100° C. is approximately 70% oil swell by volume.

9. The belt according to claim 1 further comprising slats arranged lengthwise across a width of the belt, and spaced apart along the length of the belt and secured thereto.

10. The belt according to claim 1 further comprising pick-up tines extending outwardly from a surface of the belt and spaced apart on a surface of the belt.

11. A crop harvesting belt mounted to a mobile farm machine for harvesting crops in the field, the belt in contact with the crops, comprising:

a first fabric layer;

a first rubber coating layer applied to said first fabric layer, said first coating layer comprising styrene butadiene rubber and nitrile rubber.

12. The belt according to claim 11 further comprising a second fabric layer arranged on a side of said first fabric layer opposite said first rubber coating layer, a second rubber coating layer arranged between said first and second fabrics, and a third rubber coating layer covering a side of said second fabric opposite said first fabric layer.

13. The belt according to claim 12, wherein said second and third coating layers comprise styrene butadiene rubber and nitrile rubber.

14. The belt according to claim 12, wherein said first fabric layer is composed of spun polyester fabric and said second fabric layer is composed of filament polyester fabric.

\* \* \* \* \*